Patented June 2, 1931

1,807,599

UNITED STATES PATENT OFFICE

ROBERT C. PALMER, JOHN L. BURDA, AND ANTHONY F. OLIVER, OF PENSACOLA, FLORIDA

PROCESS OF PURIFYING ROSIN

No Drawing.   Application filed December 26, 1929. Serial No. 416,750.

This invention relates to the purification of rosin and more particularly to the purification and decolorization of wood rosin by means of fuller's earth.

The problem of purifying rosin, especially wood rosin, has occupied the minds of various experts in the art for a score of years. Wood rosin extracted from the stumps of trees or chipped wood contains a considerable amount of impurities which impart to it a dark color and make it unfit for use in the sizing of paper, manufacture of soaps and in other technical industries. Various methods, including the filtration of a rosin solution through fuller's earth, have heretofore been proposed to purify wood rosin, but few have been commercially feasible. The fuller's earth method is described in Patents Nos. 1,505,438 and 1,559,399, one of which deals with wood rosin and the other with gum rosin.

Despite the apparent simplicity of the fuller's earth method as compared to other known methods, it has never, to the best of our knowledge, been employed on a commercial scale.

We have found that one of the chief causes of the commercial failure of the fuller's earth process, particularly as applied to wood rosin, is that the crude rosin present in "rosin extract" (that is, the liquor directly obtained by extracting wood chips with a solvent such as petroleum naphtha after previous steaming of the wood to extract turpentine and pine oil) contains as a residue appreciable quantities of pine oil and other terpenes. In addition, the purification of rosin by means of fuller's earth requires enormous quantities of the earth and in this respect is unlike the purification of other liquids, for instance petroleum oils, with the same absorbent. Thus, while in purifying petroleum hydrocarbons, a given weight of fuller's earth may be continuously used with success until many times its weight of petroleum hydrocarbon has filtered therethrough and deposited its impurities thereon, in the case of purifying rosin the earth becomes saturated with impurities to the point of substantial inoperativeness as soon as the weight of rosin that has come in contact with the earth reaches one-half or, in some cases, one-third the weight of the earth. While the earth at this point may be restored to its original adsorptive powers— "revivified", so to speak—by washing with certain solvents followed by other treatments to remove the latter, and is not absolutely wasted, still the labor involved in the "revivification", the chemicals employed and the time consumed constitutes an irreversible commercial loss, which must be charged to the small one-third or one-half weight of rosin purified.

Although this peculiarity of fuller's earth in its action on impure rosin solutions is undoubtedly well known, still no one heretofore realized that it was due in a large measure to the residue of terpenes and pine oil contained in "rosin extract" as ordinarily obtained in practice. At least, no one heretofore attempted to eliminate these residual terpenes prior to the purification of rosin by means of fuller's earth or by any other process.

This connection between the residual terpenes and the earth-rosin ratio as we now understand it, may be stated as follows:

1. Part of the terpenes polymerize in contact with the fuller's earth forming various resinous substances which are detrimental to the quality of the filtered rosin.

2. During the polymerization of these terpenes, water is split off, which has an inhibitory action upon the earth, diminishing its adsorptive powers for rosin impurities.

3. Part of the terpenes escape polymerization and act as solvents for certain impurities which are normally present in the rosin, thus preventing their adhesion to the earth. Upon ultimate elimination of the terpenes, as upon evaporation of the filtered rosin solution, these impurities remain in the rosin, darkening its color and thereby decreasing its grade and quality. If the terpene-free rosin be dissolved in a solvent such as gasoline or naphtha, these impurities precipitate in the form of gummy and pitchy resins. Hereinafter such impurities will be referred to as "petroleum-insolubles."

4. Due to the partial polymerization of the terpenes mentioned above, part of the "petroleum-insolubles" are thereby precipitated to the detriment of the earth. Their precipitates are of a gummy and pitchy nature and accordingly clog the filter bed, interfering with the free flow of rosin solution and also diminishing the effective, adsorptive powers of the earth.

The effect of these evils, singly or in combination, is two-fold: first, the grade of the filtered rosin is considerably reduced; secondly, the quantity of rosin a given weight of fuller's earth will successfully purify up to a given grade is considerably diminished, in some cases by as much as 35%.

Based on this discovery, we have provided a process for purifying rosin, especially wood rosin, on a commercial scale by filtering a solution of the same in a suitable solvent such as petroleum naphtha or the like through fuller's earth, the process also including as a preliminary step the treatment of the rosin to eliminate the terpenes and pine oil. We further contemplate the removal in the preliminary step of the "petroleum insolubles" in order to further decrease the amount of fuller's earth required, since with the terpenes removed these impurities would be adsorbed on the earth.

It is accordingly an object of this invention to purify rosin, especially wood rosin, by pre-treating a rosin solution to remove therefrom terpenes and petroleum insoluble substances and filtering the solution through fuller's earth.

Other and further important objects will become apparent from the following description and appended claims.

In general practice wood rosin is obtained by treating comminuted stumps, roots or wood of the pine tree in the form of chips, shreds or sawdust with steam under pressure to remove therefrom the turpentine and the bulk of the pine oil. Due to the fact that high temperatures cause decomposition of the rosin and the adsorption of certain impurities from the wood, this process cannot be carried to the point of complete exhaustion of the pine oil and other terpenes. Following this treatment, the wood is flooded with naphtha, gasoline or similar rosin solvent to extract its rosin content. These liquids are also good solvents for the residual pine oil and terpenes and accordingly the latter find their way into the resulting solution. This solution or "rosin extract," will also contain various resinous impurities such as wood dust, earth, and other impurities either in solution or suspension. The proportion of rosin in this extract is generally about 10% by weight.

According to our process the rosin extract as obtained above is cleansed of mechanical dirt and suspended material by any conventional method, as for instance filtering, or washing with water, settling and decanting. This solution is then subjected to a steaming process to remove the bulk of the rosin solvent. The residual rosin-containing mass is then further steamed at more elevated temperatures (dry steam), whereby the terpenes (pine oil or other terpenes) are volatilized, and are practically completely removed. The residue in the still comprising the 10 parts of dark rosin material mentioned above is then dissolved in about 10 parts of a petroleum distillate (not the material recovered from the above step in view of its contamination with the terpene oil), the preferred boiling range of which is 100° to 160° C., although other low boiling liquid petroleum distillates may be used. The resulting solution is cooled to about 20° C. and an additional 35 parts of the same cold petroleum solvent added, whereupon precipitation of the "petroleum insolubles" takes place. The solution is decanted from the pitchy residue and washed with cold water to remove such impurities as are present in a more or less colloidal state. The again decanted solution is allowed to completely settle to remove mechanically mixed water. The rosin solution is then ready for purification by the fuller's earth filtration.

The above treatment removes the terpenes and cold "petroleum insolubles" to a sufficient extent to permit a successful treatment with fuller's earth.

The following data serves to clearly indicate the advantages accruing from our process over the process of directly filtering the rosin extract through fuller's earth.

An average sample of "rosin extract" has the following approximate composition:

|  | Per cent |
|---|---|
| Gasoline | 80 |
| Rosin | 10 |
| Pine oil | 1 |
| Other terpenes | 9 |

By filtering 100 parts of this sample extract, containing 10 parts of rosin, directly through 10 parts of fuller's earth, a rosin of grade G is obtained; through 15 parts of fuller's earth, a rosin of grade G+; through 20 parts of fuller's earth, a rosin of grade H; through 30 parts of fuller's earth, a rosin of grade I.

On the other hand by steaming 100 parts of the original liquor or "rosin extract" at a temperature of 150° C., 10 parts of an impure rosin residue containing no more than a trace of residual terpenes is obtained. Dissolution of this residue in 45 parts of petroleum naphtha and stirring removes 0.45 parts of "petroleum insolubles". Stirring with cold water removes 0.05 parts of water insolubles. When this solution is filtered through fuller's earth in the ratio of 10 parts of rosin to 30 parts of earth, a rosin of grade M is directly obtained.

As seen from the above data, where it takes 30 parts of fuller's earth to purify 10 parts of rosin contained in original liquor to give a resultant "I" grade, the same amount of earth when applied to the same quantity of rosin prepurified according to our invention, gives a rosin of grade M. Conversely, if a grade I is to be obtained from the same quantity of rosin, but prepurified according to our invention, the quantity of fuller's earth may be reduced to ⅔ of its previous value.

It is, of course, to be understood that other preliminary purification steps may be inserted in their proper order in our pretreatment process. For instance after steaming off the residual terpenes, and removing the "petroleum insolubles", the petroleum-naphtha solution may be agitated with cold water, to effect removal of certain additional impurities. This step is advantageous at this point in view of the dissolved state of the rosin in a liquid which is itself substantially immiscible with water. However, these steps do not constitute the essence of this invention and might be incorporated at other stages during the process with at most a loss of efficiency.

This is not true, however, of the removal of the terpenes, for they must be eliminated before the fuller's earth treatment in order to obtain the very desirable result herein set forth.

It is further to be understood that the process of pre-treating the wood rosin for the purpose of removing pine oil and other terpenes therefrom prior to a treatment with fuller's earth is not to be confused with the conventional practice of removing turpentine and pine oil from the comminuted wood before subjecting the wood to the extraction step.

While in both cases the terpenes appear to be removed by steam distillation, the presence of wood fibre in the first instance and the relative compactness of the rosin mass in the second, make the effect of the two steam distillations radically different.

Although the above description deals principally with the purification of wood rosin, gum rosin may be treated in an entirely analogous manner and when further purified with fuller's earth, possesses similar advantages in respect to its wider application in the industrial art.

We are aware that numerous details of the process may be varied through a wide range without departing from the principles of this invention, and we, therefore, do not purpose limiting the patent granted hereon otherwise than necessitated by the prior art.

We claim as our invention:

1. In the process of pre-purifying rosin preliminary to filtration through fuller's earth, the step of removing substantially all of the terpenes including pine oil from the rosin.

2. In the process of pre-purifying wood rosin as obtained in the solvent extraction of resinous wood after evaporation of the bulk of the solvent preliminary to filtration through fuller's earth, the step of heating such rosin to remove terpenes therefrom.

3. In the process of purifying rosin that includes a treatment of the rosin with fuller's earth, the step which comprises subjecting impure rosin to a treatment with steam for the removal therefrom of substantially all of the terpenes including pine oil, prior to filtering the partially purified rosin through fuller's earth.

4. In the process of purifying wood rosin that includes a treatment of the rosin with fuller's earth, the step which comprises subjecting the impure wood rosin to a preliminary treatment for the removal therefrom of substantially all of the terpenes including pine oil prior to filtering the partially purified wood rosin through fuller's earth.

5. The process of pre-purifying wood rosin as obtained in the solvent extraction of resinous wood after evaporation of the bulk of the solvent preliminary to filtration of the rosin in solution through fuller's earth, which comprises heating such rosin to remove substantially all terpenes contained therein, dissolving the residual rosin in a usual solvent therefor, cooling the rosin solution to effect separation of pitchy matter therefrom and separating the rosin solution from said pitchy matter.

6. The process of purifying wood rosin as obtained in the solvent extraction of resinous wood after evaporation of the bulk of the solvent, which comprises heating such rosin to remove substantially all terpenes contained therein, dissolving the residual rosin in a usual solvent therefor, cooling the rosin solution to effect separation of pitchy matter therefrom, separating the rosin solution from said pitchy matter and subsequently treating the purified rosin solution with fuller's earth.

7. In the process of pre-purifying wood rosin as obtained in the solvent extraction of resinous wood after evaporation of the bulk of the solvent preliminary to a filtration of the rosin in solution through fuller's earth, the steps which comprise heating such rosin to remove terpenes, dissolving the residual rosin in a petroleum distillate, cooling the rosin solution to effect separation of pitchy matter, removing said pitchy matter, washing the remaining rosin solution with water to effect a further removal of impurities and recovering the pre-purified rosin in solution.

8. In the process of pre-purifying wood rosin as obtained in the solvent extraction of resinous wood after evaporation of the bulk of the solvent preliminary to a filtration of the rosin in solution through fuller's earth, the steps which comprise steaming such rosin to remove terpenes, dissolving the residual rosin in a petroleum distillate having a boiling range of approximately 100 to 160° C., cooling the rosin solution to effect separation of pitchy matter and recovering the pre-purified rosin in solution.

9. In the process of pre-purifying wood rosin as obtained in the solvent extraction of resinous wood after evaporation of the bulk of the solvent preliminary to a filtration of the rosin in solution through fuller's earth, the steps which comprise steaming such rosin to remove terpenes, dissolving the residual rosin in a petroleum distillate having a boiling range of approximately 100 to 160° C., cooling the rosin solution to effect separation of pitchy matter, removing said pitchy matter, washing the remaining rosin solution with water to effect a further removal of impurities and recovering the pre-purified rosin in solution.

10. Process of recovering a purified wood rosin from a rosin solution as obtained by the solvent extraction of resinous wood, comprising evaporating the extract to remove the solvent, heating the residue to remove terpenes, redissolving the residue in a petroleum distillate fraction, cooling to separate the pitchy matter from the resulting solution and treating the solution with fuller's earth.

11. Process of recovering a purified wood rosin from a rosin solution as obtained by the solvent extraction of resinous wood, comprising evaporating the extract to remove the solvent, heating the residue to remove substantially all the terpenes, redissolving the residue at an elevated temperature in a petroleum fraction having a boiling range between 100° and 160° C., cooling the resulting solution to precipitate impurities, separating the impurities from the solution and treating the solution with fuller's earth.

12. The process of recovering a purified wood rosin from a rosin solution obtained by the solvent extraction of resinous wood, comprising evaporating the solvent from the rosin solution, steaming the residue to remove terpenes, redissolving the residue at an elevated temperature in a petroleum fraction having a boiling range between 100° and 160° C., cooling the solution to precipitate impurities, separating the solution from said impurities, agitating the solution with water to precipitate certain other impurties, separating the rosin solution from the water and treating the solution thus obtained with fuller's earth.

In testimony whereof, we have hereunto subscribed our names at Pensacola, county of Escambia, Florida.

ROBERT C. PALMER.
JOHN L. BURDA.
ANTHONY F. OLIVER.

CERTIFICATE OF CORRECTION.

Patent No. 1,807,599. Granted June 2, 1931, to

ROBERT C. PALMER ET AL.

It is hereby certified that the above numbered patent was erroneously issued to the inventors, whereas said patent should have been issued to The Newport Company, of Carrollville, Wisconsin, a corporation of Delaware, as assignee of the entire interest in said invention, as shown by the records of assignments in this office; and that the said Letters Patent should be read with this correction therein that the same may conform to the record of the case in the Patent Office.

Signed and sealed this 14th day of July, A. D. 1931.

(Seal)

M. J. Moore,
Acting Commissioner of Patents.